United States Patent [19]

Kobayashi

[11] Patent Number: 5,822,702
[45] Date of Patent: Oct. 13, 1998

[54] RADIO RECEIVING TERMINAL HAVING COMMON RECEIVER CIRCUITRY FOR BOTH RECEIVING A RADIO SIGNAL INCLUDING A CALL NUMBER AND A REMOTE CONTROL SIGNAL

[75] Inventor: Yasuhiro Kobayashi, Tokyo, Japan

[73] Assignee: NEC Corporation, Tokyo, Japan

[21] Appl. No.: 664,175

[22] Filed: Jun. 14, 1996

[30] Foreign Application Priority Data

Jun. 14, 1995 [JP] Japan ..................................... 7-146648

[51] Int. Cl.⁶ ....................................................... H04B 1/38
[52] U.S. Cl. ......................... 455/550; 455/567; 455/575; 455/355; 340/825.72
[58] Field of Search ................................ 455/33.1, 54.1, 455/54.2, 73, 82, 83, 84, 88, 89, 91, 92, 95, 100, 102, 103, 104, 105, 150.1, 151.1, 151.2, 151.3, 151.4, 152.1, 154.1, 200.1, 352, 353, 355, 38.1, 38.4, 567, 550, 575, 556, 557, 559; 340/426, 539, 573, 825.44, 825.56, 825.69, 825.72, 825.46; 379/58, 61

[56] References Cited

U.S. PATENT DOCUMENTS 4,835,531 5/1989 Sato .................................... 340/825.72
5,404,572 4/1995 Ishii ......................................... 455/103
5,561,712 10/1996 Nishihara .................................. 379/61

FOREIGN PATENT DOCUMENTS

404280193 10/1992 Japan ................................ 340/825.72

*Primary Examiner*—Thanh Cong Le
*Attorney, Agent, or Firm*—Sughrue, Mion, Zinn, Macpeak & Seas, PLLC

[57] ABSTRACT

A radio receiving terminal has a receiving circuit for first and second radio signals, the first receiving radio signal including a call number; a judging circuit for judging whether or not the first radio signal received by the receiving circuit includes a call number which corresponds to its own call number; a notifying circuit for externally notifying that the terminal has received the first radio signal including the call number which corresponds to its own call numbers when the judging circuit detects a correspondence therebetween; a remote controller for instructing that the notifying of the notifying circuit be stopped second through a second radio signal; and a circuit for controlling the receiving circuit a transmission of to receive the second radio signal from the remote controller instead of the first signals when the judging circuit detects the correspondence.

16 Claims, 5 Drawing Sheets

RADIO RECEIVING TERMINAL HAVING COMMON RECEIVER CIRCUITRY FOR BOTH RECEIVING A RADIO SIGNAL INCLUDING A CALL NUMBER AND A REMOTE CONTROL SIGNAL

FIELD OF THE INVENTION

This invention relates to a radio receiving terminal, and more particularly to, a radio receiving terminal which has means for externally notifying that a radio signal demodulated by a selective call signal is received.

BACKGROUND OF THE INVENTION

A conventional radio receiving terminal such as a paging device, a portable telephone or the like comprises a receiving unit for receiving and demodulating a radio signal demodulated by a selective call signal, a controller which judges the calling signal received by the receiving unit, and a notifying unit for notifying a user with the terminal by the audible sound of a buzzer, vibration of a vibrator or the like when the controller judges that its own ID(identification information) is received.

Further, some conventional radio receiving terminals are provided with a miniaturized remote controller for stopping the notifying action such as an audible sound or vibration at the terminal which may be kept in a bag. Such remote controller is generally connected through radio communication to the terminal. For example, Japanese patent application No. 7-128895 suggests a wireless vibrator which comprises a receiving unit for receiving a signal from a portable telephone, a vibrator which vibrates when receiving the signal from the portable telephone, a display for showing information of the other telephone calling the portable telephone, means for producing a signal to instruct to, and means for transmitting the hold instructing signal to the portable telephone.

However, in such a conventional radio receiving terminal with the remote controller, another receiving unit for remote control other than the receiving unit for receiving a call signal is needed, thereby causing the increase in the number of parts, cost and consumed power.

SUMMARY OF THE INVENTION

Accordingly, it is an object of the invention to provide a radio receiving terminal in which another receiving unit for remote control other than the receiving unit for receiving a call signal is not necessary.

According to the invention, a radio receiving terminal, comprises:

means for receiving a radio signal in which a call number is added;

means for judging whether or not the call number received by the receiving means corresponds to its own call number;

means for externally notifying that the terminal is called by the radio signal when the judging means detects correspondence therebetween;

a remote controller for instructing to stop the notifying of the notifying means through a radio signal; and means for controlling the receiving means to be receivable to the radio signal from the remote controller when the means judging means detects the correspondence.

In a radio receiving terminal according to the invention, when a controller detects the correspondence between a call number of a baseband signal converted in a receiving unit and its own call number and actuates a notifying unit, the controller informs a PLL circuit of frequency information corresponding to the transmission frequency of a remote controller to make it receivable to a radio signal from the remote controller. When instruction for stopping the notification from the remote controller is received, the controller controls the notifying unit to stop the notifying action. Thus, only by changing the frequency information sent to the PLL circuit, the receiving unit can receive both the radio signal for calling the radio receiving terminal and radio signal for remote control. Namely, the receiving unit can be used in both the reception of the radio signal for calling the radio receiving terminal and the reception of the radio signal for remote control.

Therefore, another receiving unit for remote control other than the receiving unit for receiving the radio signal to call the radio receiving terminal is not necessary, whereby the increase in the number of parts, cost and consumed power can be suppressed.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
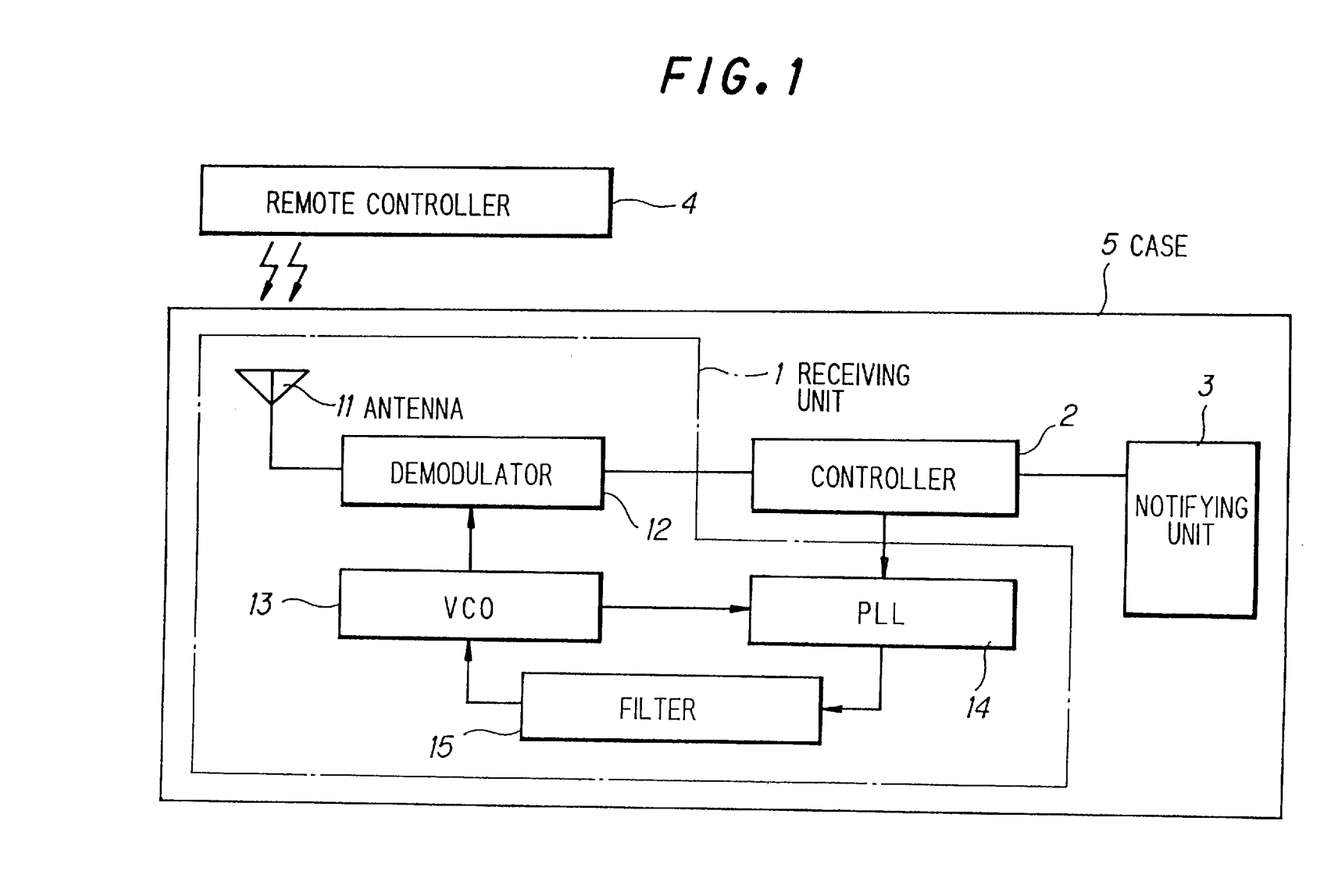
FIG. 1 is a block diagram showing a radio receiving terminal in a preferred embodiment according to the invention.

A radio receiving terminal in the preferred embodiment will be explained with reference to FIG. 1.

The radio receiving terminal comprises a receiving unit 1, a controller 2, a notifying unit 3 and a remote controller 4. Here, the receiving unit 1, controller 2 and notifying unit 3 are packaged in a case 5, and the remote controller 4 is outside the case 5.

The receiving unit 1 comprises an antenna 11, a demodulator 12, a voltage-controlled oscillator(VCO) 13, a phase-locked loop (PLL) circuit 14 and a filter 15. The filter 15 is a direct-current voltage converter for inputting a signal of the PLL circuit 14 to VCO 13.

In operation, when the reception operation of the radio receiving terminal is started by switching on a power source, the controller 2 informs the PLL circuit 14 of reception frequency information to provide a frequency corresponding to the signal frequency on which its own call number is output.

The PLL circuit 14 outputs a signal based on the reception frequency information from the controller 2 through the filter 15 to VCO 13. VCO 13 produces an analog signal based on the signal from the PLL circuit 14 and outputs it to the demodulator 12.

When a radio signal (see element 60 of FIG. 6) is received by the antenna 11, it is sent to the demodulator 12 where it is converted into a baseband signal based on the analog signal from VCO 13. The baseband signal converted at the demodulator 12 is input to the controller 2 which judges whether or not it corresponds to the call number predetermined by the controller 2.

If the correspondence therebetween is detected, the controller 2 controls the notifying unit 3 to inform a user of the radio receiving terminal of the reception of a call. Here, the notifying unit 3 comprises a buzzer, a vibrator or the like, which notifies the user of the reception of a call by the audible sound of a buzzer, oscillating of the vibrator or the like.

On the other hand, the controller 2 informs the PLL circuit 14 of frequency information corresponding to a transmission frequency of the remote controller 4 while actuating the notifying unit 3 when its own call number is received by the receiving unit 1.

The PLL circuit 14 outputs a signal based on this frequency information from the controller 2 through the filter 15 to VCO 13. VCO 13 produces an analog signal based on the signal from the PLL circuit 14 and outputs it to the demodulator 12. Thus, the receiving unit 1 is in the state that a radio signal from the remote controller 4 can be received thereby.

When an instruction for stopping the notification is received through a radio signal from the remote controller 4 during the notifying action of the notifying unit 3, the instruction signal is sent from the receiving unit 1 to the controller 2. When the instruction signal for stopping the notification is received by the controller 2, the controller 2 controls the notifying unit 3 to stop the notifying action.

Figure 2:
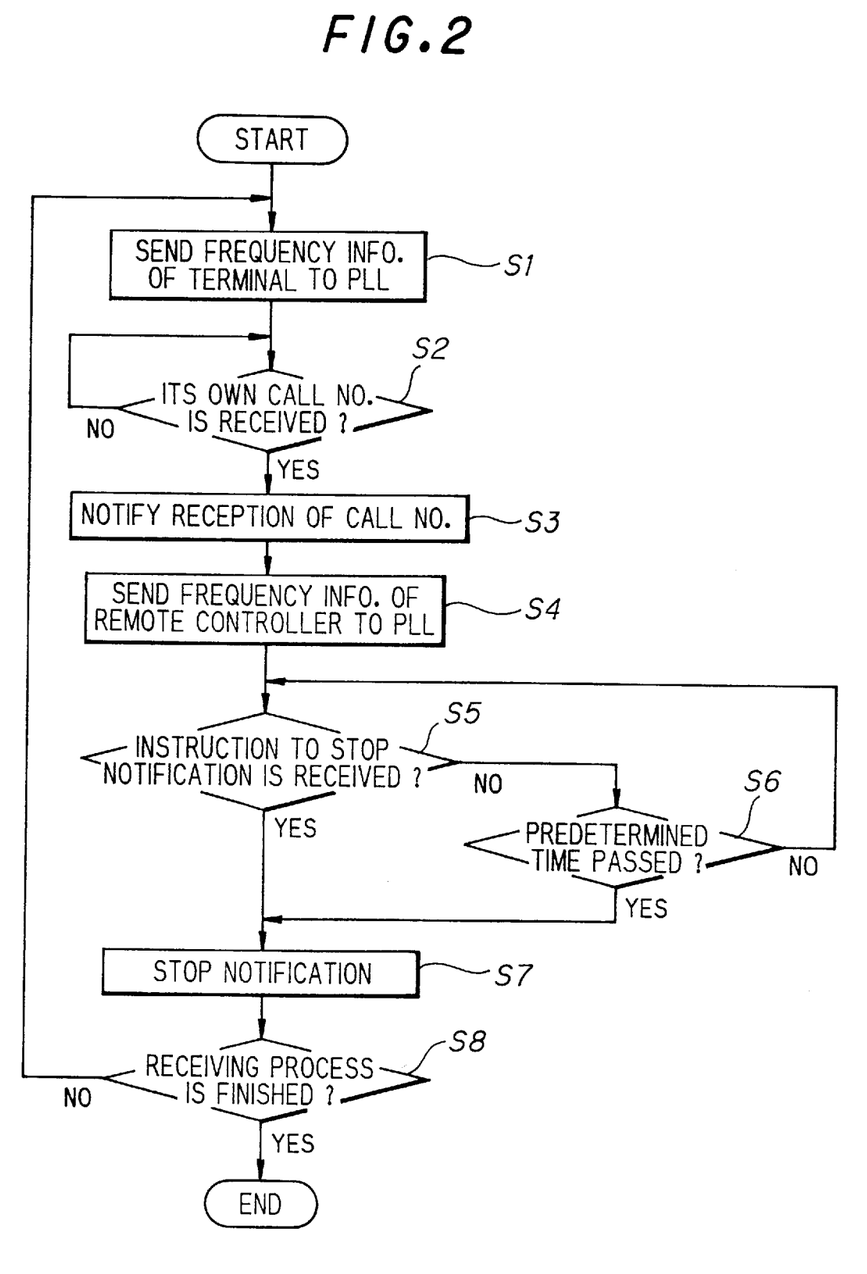
FIG. 2 is a flow chart showing a control process by a controller in FIG. 1.
Figure 3:
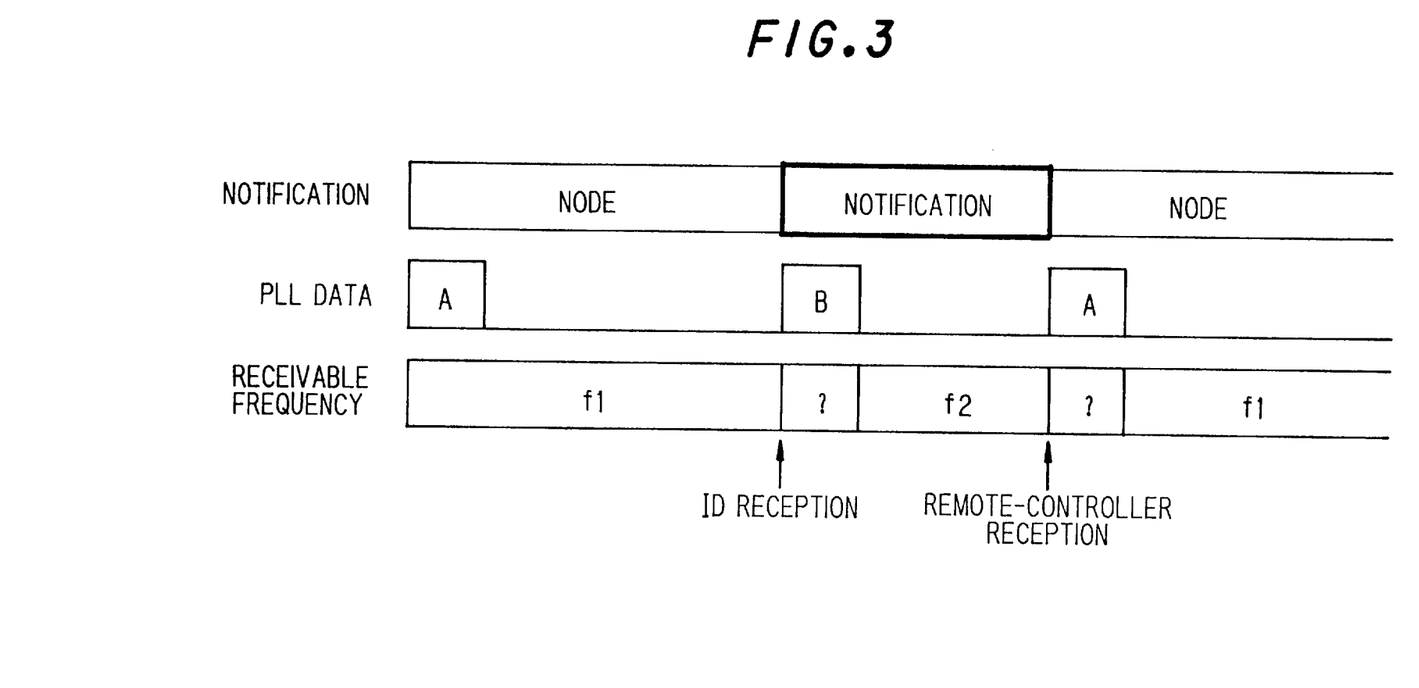
FIG. 3 is a timing chart on the control process in FIG. 2, and FIGS. 4 and 5 are alternative timing charts on the control process by the controller in FIG. 1.

Referring to FIGS. 2 and 3, the operation of the radio receiving terminal in the preferred embodiment will further be explained below. FIG. 2 is a flow chart showing the control process of the controller 2 in FIG. 1, and FIG. 3 is a timing chart on the control process.

When the reception in the radio receiving terminal is started by switching on a power source, the controller 2 informs the PLL circuit 14 of reception frequency information (A) to provide a frequency corresponding to the signal frequency on which its own call number is output( Step S1 in FIG. 2 ).

The PLL circuit 14 outputs a signal based on the reception frequency information from the controller 2 through the filter 15 to VCO 13. VCO 13 produces an analog signal based on the signal from the PLL circuit 14 and outputs it to the demodulator 12.

When a radio signal with a frequency of f1 is received by the antenna 11, it is sent to the demodulator 12 where it is converted into a baseband signal based on the analog signal from VCO 13. The baseband signal converted at the demodulator 12 is input to the controller 2 which judges whether or not it corresponds to the predetermined call number of the controller 2( Step S2 in FIG. 2 ).

If the correspondence therebetween is detected by the controller 2( ID reception ), the controller 2 controls the notifying unit 3 to inform a user of the radio receiving terminal that a call has been receiving( Step S3 in FIG. 2 ).

Then, the controller 2 informs the PLL circuit 14 of frequency information corresponding to a transmission frequency of the remote controller 4 while actuating the notifying unit 3 when its own call number has been received by the receiving unit 1.

The PLL circuit 14 outputs a signal based on this frequency information from the controller 2 through the filter 15 to VCO 13. VCO 13 produces an analog signal based on the signal from the PLL circuit 14 and outputs it to the demodulator 12. Thus, the receiving unit 1 is in the state that a radio signal (frequency:f2) from the remote controller 4 can be received thereby.

During the notifying action of the notifying unit 3, the controller 2 judges whether or not the instruction for stopping the notification is received through the radio signal from the remote controller 4 or through a signal from a switch (not shown) provided on the case 5( Step S5 in FIG. 2 ).

Figure 6:
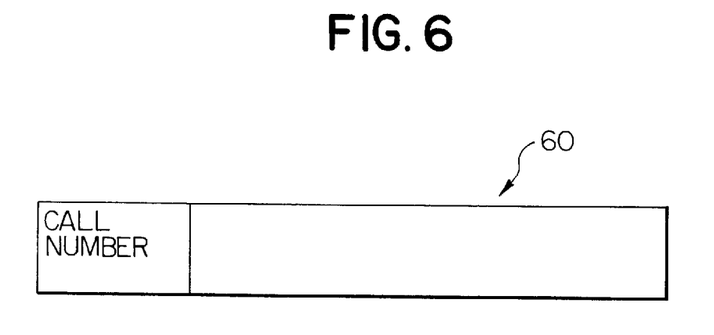
FIG. 6 shows a radio signal according to the present invention.

If the instruction for stopping the notification is not received, the controller 2 judges whether or not a predetermined time has passed( Step S6 in FIG. 6 ). If the predetermined time does not pass, returning to Step S5, the controller 2 waits the input of the instruction for stopping the notification.

When the instruction signal for stopping the notification is received by the controller 2 through the radio signal from the remote controller 4 or through the signal from the switch, the controller 2 controls the notifying unit 3 to stop the notifying action( Step S7 in FIG. 2 ).

Thereafter, the controller 2 judges whether or not the receiving process is terminated by switching off the power source( Step S8 in FIG. 2 ). If terminated, the controller 2 controls the termination of the receiving process. If not terminated, Step S1 is repeated, and the controller 2 informs the PLL circuit 14 of the reception frequency information (A) to provide the frequency corresponding to the signal frequency on which its own call number is output. Thus, the receiving unit 1 is in the state that the radio signal with the frequency of f1 can be received.

Figure 4:
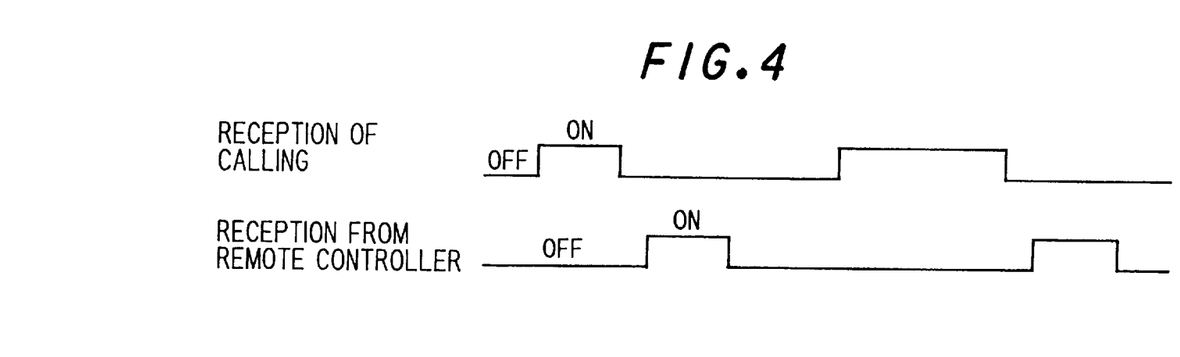
Figure 5:
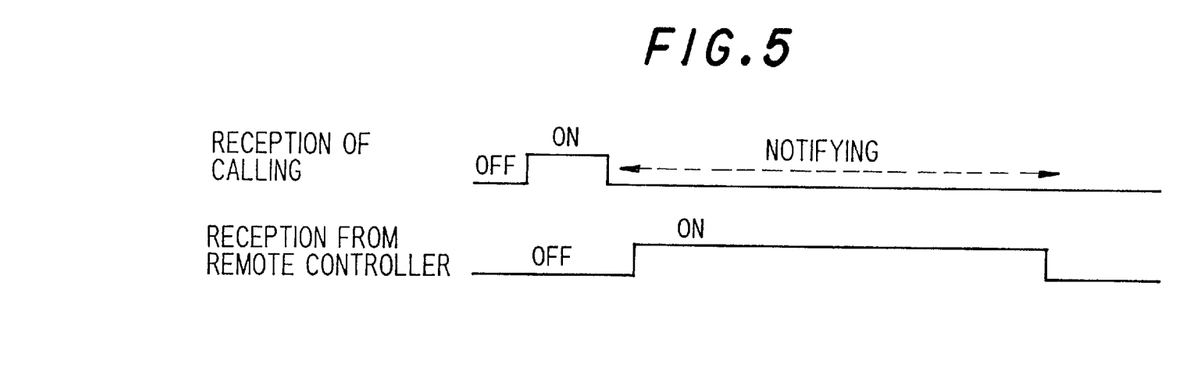

Alternatively, the control process of the controller 2 may be made as shown in timing charts of FIGS. 4 and 5.

As shown in FIG. 4, a radio receiving terminal such as a paging device generally repeats switching on and off such that the life of a dry cell used therein can be lengthened as long as possible. Thus, the reception of a call from a transmitter such as a telephone is periodically switched off for a time. In this example, the controller 2 controls the reception from the remote controller 4 to be allowed while the terminal has switched off the reception of a call from a transmitter. Therefore, the radio communication between the terminal and the remote controller 4 can be carried out without affecting the reception of calling from the transmitter.

Furthermore, as shown in FIG. 5, while the notifying unit 3 gives notification of the reception of a call from the transmitter, the reception of a call may be prohibited. In this case, the controller 2 can control the reception of a signal from the remote controller 4 to be allowed while the reception of a call is prohibited. Therefore, the radio communication between the terminal and the remote controller 4 can be carried out during the audible sound or vibrating action of the notifying unit 3.

As explained above, when the controller 2 detects the correspondence between the call number of the baseband signal converted in the receiving unit 1 and its own call number and actuates the notifying unit 3, the controller 2 informs the PLL circuit 14 of frequency information corresponding to the transmission frequency of the remote controller 4 to make it receivable to the radio signal from the remote controller 4. When the instruction for stopping the notification from the remote controller 4 is received, the controller 2 controls the notifying unit 3 to stop the notifying action. Thus, only by changing the frequency information sent to the PLL circuit 14, can the receiving unit 1 receive both the radio signal for calling the radio receiving terminal and radio signal for remote control. Namely, the receiving unit 1 can be used in both the reception of the radio signal for calling the radio receiving terminal and the reception of the radio signal for remote control.

Therefore, another receiving unit for remote control other than the receiving unit for receiving the radio signal to call the radio receiving terminal is not necessary, whereby the increase in the number of parts, cost and consumed power can be suppressed.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A radio receiving terminal, comprising:

means for receiving first and second radio signals, said first radio signal including a call number;

means for judging whether or not said first radio signal received by said means for receiving includes a call number which corresponds to its own call number;

means for externally notifying that said terminal has received said first radio signal including said call number which corresponds to its own call number when said means for judging detects a correspondence therebetween;

a remote controller for instructing said means for externally notifying to stop notifying through a transmission of a second radio signal; and means for controlling said means for receiving to receive said second radio signal from said remote controller and to output a baseband signal of said second radio signal instead of a baseband signal of said first radio signal when said means for judging detects said correspondence, wherein said first and second radio signals cannot be output at the same time.

2. A radio receiving terminal, according to claim 1, wherein:

said means for receiving comprises an antenna for receiving said first and second radio signals, means for demodulating said first and second radio signals received by said antenna into a baseband signal, a voltage-controlled oscillator in which an analog signal used for the demodulating in said demodulating means is produced and a phase-locked loop for controlling said voltage-controlled oscillator; and said means for controlling comprises means for outputting frequency information according to a judgement of said judging means to said phase-locked loop.

3. A radio receiving terminal, according to claim 2, wherein:

said means for controlling controls said means for receiving to have a reception frequency by which said means for receiving can receive said second radio signal from said remote controller and output said baseband signal of said second radio signal when said means for judging detects said correspondence.

4. A radio receiving terminal, according to claim 2, wherein:

said means for controlling controls said means for receiving to have a reception frequency by which said means for receiving can receive said second radio signal from said remote controller and output said baseband signal of said second radio signal when said means for receiving is not processing said first signal.

5. A radio receiving terminal, according to claim 2, wherein:

said means for controlling controls said means for receiving to have a reception frequency by which said means for receiving can receive said second radio signal from said remote controller when said means for notifying externally notifies and to output only said baseband signal of said second radio signal from said remote controller.

6. A radio receiving terminal, according to claim 1, wherein:

said means for controlling controls said means for receiving to have a reception frequency by which said means for receiving can receive said second radio signal from said remote controller and output said baseband signal of said second radio signal when said means for judging detects said correspondence.

7. A radio receiving terminal, according to claim 1, wherein:

said means for controlling controls said means for receiving to have a reception frequency by which said means for receiving can receive said second radio signal from said remote controller and output said baseband signal of said second radio signal when said means for receiving is not processing said first signal.

8. A radio receiving terminal, according to claim 1, wherein:

said means for controlling controls said means for receiving to have a reception frequency by which said means for receiving can receive said second radio signal from said remote controller when said means for notifying externally notifies and to output only said baseband signal of said second radio signal from said remote controller.

9. A radio receiving terminal, comprising:

a receiving circuit for receiving first and second radio signals, said first radio signal including a call number;

a judging circuit for judging whether or not said first radio signal received by said receiving circuit includes a call number which corresponds to its own call number;

a notification circuit for externally notifying that said terminal has received said first radio signal including said call number which corresponds to its own call number when said judging circuit detects a correspondence therebetween;

a remote controller for instructing said notification circuit to stop notifying through a transmission of a second radio signal; and a control circuit for controlling said receiving circuit to receive said second radio signal from said remote controller and to output a baseband signal of said second radio signal instead of a baseband signal of said first radio signal when said judging circuit detects said correspondence, wherein said first and second radio signals cannot be output at the same time.

10. A radio receiving terminal, according to claim 9, wherein:

said receiving circuit comprises an antenna for receiving said first and second radio signals, a demodulator for demodulating said first and second radio signals received by said antenna into a baseband signal, a voltage-controlled oscillator in which an analog signal used for demodulating said first and second radio signals by said demodulator is produced, and a phase-locked loop for controlling said voltage-controlled oscillator; and said control circuit comprises a frequency information outputting circuit which outputs frequency information according to a judgement of said judging circuit to said phase-locked loop.

11. A radio receiving terminal, according to claim 10, wherein:

said control circuit controls said receiving circuit to have a reception frequency by which said receiving circuit can receive said second radio signal from said remote controller and to output said baseband signal of said second radio signal when said judging circuit detects said correspondence.

12. A radio receiving terminal, according to claim 10, wherein:

said control circuit controls said receiving circuit to have a reception frequency by which said receiving circuit can receive said second radio signal from said remote controller and to output said baseband signal of said second radio signal when said receiving circuit is not processing said first signal.

13. A radio receiving terminal, according to claim 10, wherein:

said control circuit controls said receiving circuit to have a reception frequency by which said receiving circuit can receive said second radio signal from said remote controller when said notification circuit externally notifies and to output only said baseband signal of said second radio signal from said remote controller.

14. A radio receiving terminal, according to claim 9, wherein:

said control circuit controls said receiving circuit to have a reception frequency by which said receiving circuit can receive said second radio signal from said remote controller and output said baseband signal of said second radio signal when said judging circuit detects said correspondence.

15. A radio receiving terminal, according to claim 9, wherein:

said control circuit controls said receiving circuit to have a reception frequency by which said receiving circuit can receive said second radio signal from said remote controller and output said baseband signal of said second radio signal when said receiving circuit is not processing said first signal.

16. A radio receiving terminal, according to claim 9, wherein:

said control circuit controls said receiving circuit to have a reception frequency by which said receiving circuit can receive said second radio signal from said remote controller when said notification circuit externally notifies and to output only said baseband signal of said second radio signal from said remote controller.

* * * * *

UNITED STATES PATENT AND TRADEMARK OFFICE
CERTIFICATE OF CORRECTION

PATENT NO.: 5,822,702
DATED: October 13, 1998
INVENTOR(S): Yasuhiro KOBAYASHI

It is certified that error appears in the above-identified patent and that said Letters Patent is hereby corrected as shown below:

In the Abstract, Line 11 delete "second through a second" and insert --through a transmission of a second--

In the Abstract, Line 12 insert --controlling-- after "; and a"

In the Abstract, Line 13 delete "a transmission of"

Signed and Sealed this

Twenty-eighth Day of September, 1999

*Attest:*

Q. TODD DICKINSON

*Attesting Officer*     Acting Commissioner of Patents and Trademarks